United States Patent
Chang et al.

(10) Patent No.: US 10,698,419 B2
(45) Date of Patent: *Jun. 30, 2020

(54) METHOD AND SYSTEM FOR FOLLOWING TARGET

(71) Applicants: Trustech Technology Corporation, Taipei (TW); Go-Link Technology Co., Ltd., Hsinchu (TW)

(72) Inventors: Chun-Jen Chang, New Taipei (TW); Po-Yao Chiu, Kaohsiung (TW); Ming-Che Chiang, Taipei (TW); Ber-Lin Yang, Hsinchu (TW); Yung-Ming Tu, Hsinchu (TW)

(73) Assignee: TRUSTECH TECHNOLOGY CORPORATION, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,585

(22) Filed: Aug. 13, 2018

(65) Prior Publication Data

US 2020/0050204 A1    Feb. 13, 2020

Related U.S. Application Data

(63) Continuation of application No. 16/056,685, filed on Aug. 7, 2018.

(51) Int. Cl.
*G01C 21/00* (2006.01)
*G05D 1/02* (2020.01)
(Continued)

(52) U.S. Cl.
CPC .............. *G05D 1/028* (2013.01); *B60L 15/00* (2013.01); *B60L 50/50* (2019.02); *B60Q 9/00* (2013.01);
(Continued)

(58) Field of Classification Search
CPC ...... G05D 1/028; G05D 1/0236; B60L 50/50; B60L 15/00; B60L 2200/30; G01S 13/72;
(Continued)

(56) References Cited

U.S. PATENT DOCUMENTS

| | | | |
|---|---|---|---|
| 6,108,636 A * | 8/2000 | Yap | A45C 13/42 705/5 |
| 6,265,975 B1 * | 7/2001 | Zimmerman | G06K 17/00 340/571 |

(Continued)

FOREIGN PATENT DOCUMENTS

| | | |
|---|---|---|
| CN | 203759546 | 8/2014 |
| CN | 106965835 | 7/2017 |
| TW | 487809 | 5/2002 |

OTHER PUBLICATIONS

Office Action for Taiwan Application No. 107128509 dated Apr. 12, 2019.
(Continued)

*Primary Examiner* — Ian Jen
(74) *Attorney, Agent, or Firm* — Jackson IPG PLLC; Demian K. Jackson

(57) ABSTRACT

A system and a method for following a target are disclosed. The system includes steps of: A. providing a signal transmitting RF module mounted on a target, a signal receiving RF module on a moving carrier, and at least 3 laser rangefinders aside the signal receiving RF module; B. calculating an estimated distance and a directional angle; C. driving the moving carrier toward the target while maintaining the directional angle substantially 0 degree; D. repeating step B and step C until the estimated distance is shorter than a control exchange distance; E. dynamically tracking the target by one of the laser rangefinders so that a relative distance between said laser rangefinder and the target can be successively calculated while calculating the
(Continued)

estimated distance and the directional angle; and F. driving the moving carrier to keep the relative distance within a predetermined range and maintain the normal direction substantially toward the target.

20 Claims, 9 Drawing Sheets

(51) Int. Cl.
| | |
|---|---|
| *H04W 76/10* | (2018.01) |
| *B60Q 9/00* | (2006.01) |
| *B60L 15/00* | (2006.01) |
| *G01S 17/48* | (2006.01) |
| *G01S 13/72* | (2006.01) |
| *G01S 13/86* | (2006.01) |
| *B60L 50/50* | (2019.01) |
| *G08B 7/06* | (2006.01) |

(52) U.S. Cl.
CPC ............ *G01S 13/72* (2013.01); *G01S 13/865* (2013.01); *G01S 17/48* (2013.01); *G05D 1/0236* (2013.01); *H04W 76/10* (2018.02); *B60L 2200/30* (2013.01); *G08B 7/06* (2013.01)

(58) Field of Classification Search
CPC ...... G01S 17/48; G01S 13/865; H04W 76/10; B60Q 9/00; G08B 7/06
See application file for complete search history.

(56) References Cited

U.S. PATENT DOCUMENTS

| | | | |
|---|---|---|---|
| 6,282,483 | B1 | 8/2001 | Yano et al. |
| 6,294,997 | B1* | 9/2001 | Paratore ............. G06K 19/0717 235/385 |
| 6,327,219 | B1 | 12/2001 | Zhang et al. |
| 6,342,836 | B2* | 1/2002 | Zimmerman .......... G06K 17/00 340/571 |

OTHER PUBLICATIONS

Search Report for Taiwan Application No. 107128509 dated Apr. 12, 2019.

* cited by examiner providing a signal transmitting RF module mounted on a target, a signal receiving RF module on a moving carrier, and at least 3 laser rangefinders aside the signal receiving RF module (S01)

↓ calculating an estimated distance and a directional angle (S02)

↓ driving the moving carrier toward the target while maintaining the directional angle substantially 0 degree (S03)

↓ repeating step S02 and step S03 until the estimated distance is shorter than a control exchange distance (S04)

↓ dynamically tracking the target by one of the laser rangefinders so that a relative distance between said laser rangefinder and the target is able to be successively calculated while calculating the estimated distance and the directional angle (S05)

↓ driving the moving carrier to keep the relative distance within a predetermined range and maintain the normal direction substantially toward the target (S06)

Fig. 9

METHOD AND SYSTEM FOR FOLLOWING TARGET

FIELD OF THE INVENTION

The present invention relates to a method and a system for following a target. More particularly, the present invention relates to a method and a system for following a target by applying two different detection technologies.

BACKGROUND OF THE INVENTION

For a short walk with carrying items, people may choose a backpack or a luggage to put all items inside. If the carried items are large in size, a cart or even an electric car may be a good option to save physical strength. For example, when people play golf, a golf cart can take all equipment people need in the golf course. However, people may have further requests: can the bulky auxiliary equipment follow me wherever I am automatically? Of course, they need to be smart and power-driven.

In real life, there are indeed such inventions. For example, COWAROBOT™ R1 smart luggage provides a solution for users to be followed by their luggage. It let people free their hands to do something else. The smart luggage includes a wristband worn on a user's hand, which wirelessly communicates with the smart luggage. On the telescopic rod, there is a set of laser light module. A laser camera mounted on the handle of the telescopic rod to receive reflected laser beams from the environment, further recognizing human images in order to calculate the position of the one to follow. Meanwhile, a control module aside the laser camera controls a power wheel module so as to move as its master walks. If the smart luggage is lost to find its master, the wristband will alert. The master can come back where he was to look for the smart luggage. The smart luggage helps people travelling, shopping, and moving heavy objects.

Said smart luggage and associated applications have been widely accepted in the world. In addition to Drones, people need assistants following them around on the ground. However, such target following system (power wheel module not included) is too expensive and the tracing effect still needs to improve. Therefore, the present invention is to provide to introduce another useful target following system and applications for the requirement.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

According to an aspect of the present invention, a method for following a target is provided. The method includes the steps of: A. providing a signal transmitting radio frequency (RF) module mounted on a target, a signal receiving RF module on a moving carrier, and at least 3 laser rangefinders aside the signal receiving RF module; B. calculating an estimated distance between the signal transmitting RF module and the signal receiving RF module, and a directional angle between a direction from the signal transmitting RF module to the signal receiving RF module and a normal direction to a front plane of the moving carrier where the signal receiving RF module is located by RF signals sent from the signal transmitting RF module and received by the signal receiving RF module, wherein a first laser rangefinder has a tracing direction substantially along with the normal direction for sending and receiving laser beams; C. driving the moving carrier toward the target while maintaining the directional angle substantially 0 degree; D. repeating step B and step C until the estimated distance is shorter than a control exchange distance; E. dynamically tracking the target by one of the laser rangefinders so that a relative distance between said laser rangefinder and the target is able to be successively calculated while calculating the estimated distance and the directional angle; and F. driving the moving carrier to keep the relative distance within a predetermined range and maintain the normal direction substantially toward the target.

Preferably, the method may further comprise steps after step E and step F: E1. checking whether the relative distance is shorter than a predetermined percentage of the control exchange distance or no laser rangefinder traces the target; and E2. if one of the condition in step E1 happens, repeating step B and step C; otherwise, processing step F. The predetermined percentage may range from 50% to 90%.

According to the present invention, the method may further comprise steps after step F: G. checking whether a difference between the directional angle and a relative angle between the normal direction and a connecting line from the first laser rangefinder to the target falls within a predetermined range of degrees; and H. if a result of step G is yes, repeating step F, and if the result of step G is no, repeating step B and step C. The predetermined range of degrees may be +3%~−3%.

The normal direction substantially toward the target may be maintained by turning the moving carrier left until the first laser rangefinder traces the target if a second laser rangefinder on the left of the first laser rangefinder traces the target and turning the moving carrier right until the first laser rangefinder traces the target if a third laser rangefinder on the right of the first laser rangefinder traces the target. Tracing directions of the second laser rangefinder and/or the third laser rangefinder deviate from that of the first laser rangefinder to a predetermined angle. The predetermined angle should not be larger than 45°. The control exchange distance should range from 1.5 m to 2.5 m.

According to another aspect of the present invention, a system for following a target is provided. The system comprises: a signal transmitting RF module, mounted on a target to be followed, working to send RF signals; a signal receiving RF module, mounted on a moving carrier, pairing with the signal transmitting RF module, working to receive the RF signals sent from the signal transmitting RF module; at least 3 laser rangefinders, mounted aside the signal receiving RF module, each calculating a relative distance between itself and the target; and a controller, signally connected with the signal receiving RF module and the at least 3 laser rangefinders, operating to calculate an estimated distance between the signal transmitting RF module and the signal receiving RF module, and a directional angle between a direction from the signal transmitting RF module to the signal receiving RF module and a normal direction to a front plane of the moving carrier where the signal receiving RF module is located by RF signals sent from the signal transmitting RF module and received by the signal receiving RF module, send commands to control moving of the moving carrier, and dynamically track the target by one of the laser rangefinders so that the relative distance is able to be successively calculated. A first laser rangefinder has a tracing direction substantially along with the normal direction for sending and receiving laser beams. The controller keeps calculating the estimated distance and the directional angle and drives the moving carrier toward the target while maintains the directional angle substantially 0 degree until the estimated distance is shorter than a control exchange distance. When the estimated distance is shorter than the control exchange distance, the controller still calculates the estimated distance and the directional angle while drives the moving carrier to keep the relative distance within a predetermined range and maintain the normal direction substantially toward the target.

Preferably, when the estimated distance is found to be shorter than the control exchange distance, the controller may further check whether the relative distance is shorter than a predetermined percentage of the control exchange distance or no laser rangefinder traces the target; if one of said conditions happens, the controller utilizes the estimated distance and the directional angle to drive the moving carrier. The predetermined percentage may range from 50% to 90%.

According to the present invention, when the controller utilizes the relative distance and a relative angle, which is between the normal direction and a connecting line from the first laser rangefinder to the target, to drive the moving carrier, the controller also checks whether a difference between the directional angle and the relative angle falls within a predetermined range of degrees; if the difference falls within the predetermined range of degrees, keep driving the moving carrier with the relative distance and the relative angle; if the difference does not fall within the predetermined range of degrees, drive the moving carrier with the estimated distance and the directional angle. The predetermined range of degrees may be +3%~−3%.

The normal direction substantially toward the target may be maintained by turning the moving carrier left until the first laser rangefinder traces the target if a second laser rangefinder on the left of the first laser rangefinder traces the target and turning the moving carrier right until the first laser rangefinder traces the target if a third laser rangefinder on the right of the first laser rangefinder traces the target. Tracing directions of the second laser rangefinder and/or the third laser rangefinder deviate from that of the first laser rangefinder to a predetermined angle. The predetermined angle should not be larger than 45°. The control exchange distance may range from 1.5 m to 2.5 m.

In some embodiment, the system may further comprise an antenna module, connected to the signal receiving RF module, for receiving the signals from the signal transmitting RF module. The antenna module may comprise: an omnidirectional antenna, receiving signals from the signal transmitting RF module for pairing and stopping operating after pairing is finished; and at least 3 directional antennas, each receiving signals from a specific range of horizontal angles, wherein a difference between central directional angles of the specific range of horizontal angles for any two directional antennas is a multiple of a fixed angle. If the at least 3 directional antennas receive no signals from the signal transmitting RF module, the omnidirectional antenna initiates again for pairing.

The method and system for following a target provided by the present invention utilizes two techniques to detect the distance between the target and the moving carrier. When said detected distance is shorter than the control exchange distance, distance data from the laser rangefinders replace that from the RF modules. Therefore, a relative-distanced following can be applied to the target. Meanwhile, the system for following a target can be made compact to mount on any moving carriers, such as a smart luggage or a golf cart. Overall cost of a target-following carrier made thereby can be reduced and tracing ability is improved compared with similar products in the market.

BRIEF DESCRIPTION OF THE DRAWINGS

FIG. 9 is a flow chart of a method for following a target.

DETAILED DESCRIPTION OF THE PREFERRED EMBODIMENTS

The present invention will now be described more specifically with reference to the following embodiments.

Figure 1:
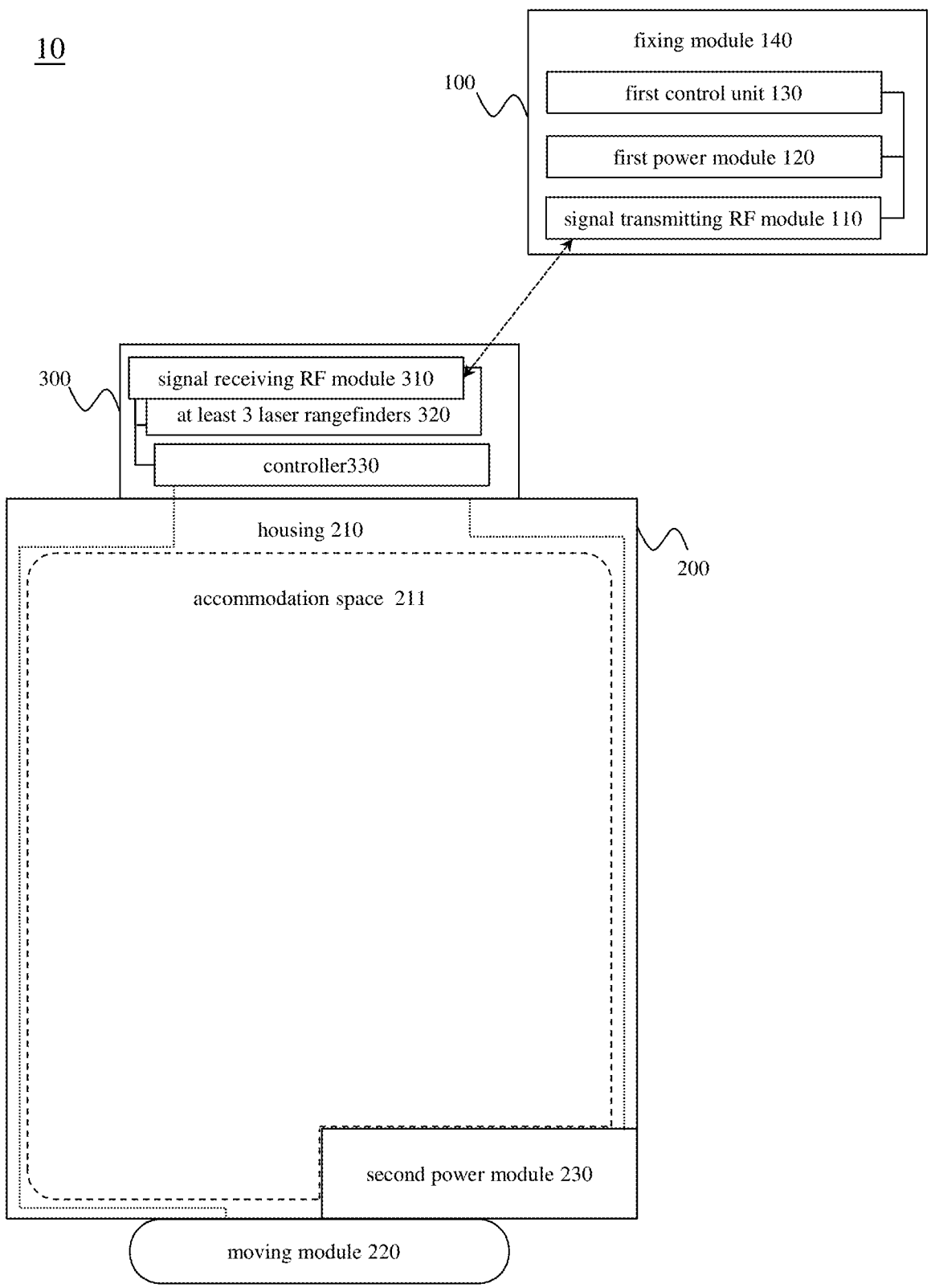
FIG. 1 is a schematic diagram of a target-following carrier according to the present invention.

Please refer to FIG. 1. An embodiment of a target-following carrier 10 according to the present invention is disclosed. The target-following carrier 10 includes three main parts: a target-end device 100, a moving carrier 200 and a target following assembly 300. Detailed description about components, functions and interactions of these parts are illustrated with associated drawings below.

The target-end device 100 is used to mounted on a target to be followed. In application, the target may be a person, moving around on the ground. The target is followed so that some carrying items can be moved accordingly. For example, if the target is a tourist, the target-following carrier 10 may be a smart luggage, automatically moving with the tourist. The target-following carrier 10 may also be a golf cart if the target is a golfer. The target-end device 100 has a signal transmitting RF module 110, a first power module 120, a first control unit 130 and a fixing module 140. The signal transmitting RF module 110 can work to send RF signals. In this embodiment, the signal transmitting RF module 110 unidirectionally transmits RF signals; in another embodiment, the signal transmitting RF module 110 may be two-way transmission. Namely, the signal transmitting RF module 110 can receive RF signals as well.

The first power module 120 is electrically connected to the signal transmitting RF module 110. It can provide power for operating any electronic component linked thereto. Since the target-end device 100 should be designed as compact as possible so that it won't become a burden for the target to carry, the choice of the first power module 120 should be carefully considered. In practice, the first power module 120 is a low power secondary battery pack, such as a lithium battery which can be recharged when power is exhausted or at a lower level. For convenience, the first power module 120 may be designed to use a low power primary battery, such as a mercury battery. It is not limited by the present invention.

The first control unit 130 is electrically connected to the signal transmitting RF module 110 and the first power module 120. The first control unit 130 may be in the form of an integrated circuit (IC). The function of the first control unit 130 is managing operation of the signal transmitting RF module 110. If possible, the first control unit 130 may be designed to control the first power module 120 for power output and recharging.

The fixing module 140 is a tool to be mounted on the target to be followed. Thus, it can carry the signal transmitting RF module 110, the first power module 120 and the first control unit 130. In practice, the fixing module 140 may be in the form of wristband to be mounted to a moving part of the target, such as a wrist of a person. Also, the fixing module 140 may be designed as a charm to be attached to a sling or installed in a key ring.

The moving carrier 200 is a main part moving to follow the target. It includes a housing 210, a moving module 220 and a second power module 230. The housing 210 is used to accommodate the carrying items such as clothes the tourist buys. Thus, the housing 210 has an accommodation space 211 as shown by the dash-lined frame in FIG. 1. In this embodiment, the accommodation space 211 is completely closed by the housing 210 and can be accessed when the housing 210 is opened. In another embodiment, the housing 210 may have several openings and the accommodation space 211 is able to connect to the space out of the housing 210. A good example of the application is a smart golf cart. Golf equipment can be placed in the accommodation space 211 while the cart body is the housing 210.

Figure 2:
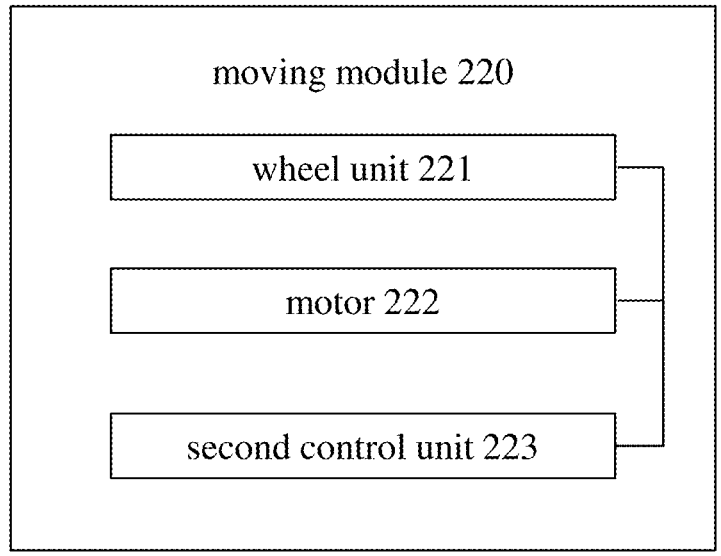
FIG. 2 shows a schematic diagram of a moving module.

The moving module 220 is in charge of moving of the moving carrier 200. It is integrated with the housing 210 and moves on the ground according to received commands. According to the present invention, the moving module 220 may further comprises some sub-modules as shown in FIG. 2. The sub-modules are a wheel unit 221, a motor 222 and a second control unit 223. The wheel unit 221 is a component group and has at least two wheels. The wheels rotate to push, stop and turn the moving carrier 220. In practice, the wheel unit 221 may be a couple of non-power wheels come with at least one power wheel. Some of the wheels can be controlled to change the direction of its rotation axis (directional wheel). The wheel unit 221 can also be a combination of universal wheels. Of course, in order to enhance off-road performance, the wheel unit 221 may be a number of track wheels with tracks therearound. However, the wheel unit 221 is powerless. Therefore, the motor 222 is coupled to the wheel unit 221 to export power to drive the wheel unit 221. Any types of motors suitable for driving the designed wheel unit 221 can be used. It is not limited by the present invention. If necessary, the number of motor 222 can be more than one to implement delicate directional control or increase speed.

Like the first control unit 130, the second control unit 223 may be in the form of an IC, electrically connected to the wheel unit 221 and the motor 222. It can control operations of the wheel unit 221 and the motor 222 according to the commands sent from a controller 330.

The second power module 230 is detachably connected to the housing 210. Namely, if the moving carrier 200 only is only required to use its carrying function without target-following function, the second power module 230 can be removed from the housing 210 to reduce the total weight of the moving carrier 200 or to keep in repair. Similarly, the second power module 230 works to provide power. Different from the first power module 120, the second power module 230 has to offer high power electricity and should be rechargeable. Hence, the second power module 230 should be a high power secondary battery pack.

The target following assembly 300 is a key part to process target following and control moving of the moving carrier 200. It is mounted on the moving carrier 200 and electrically connected to the second power module 230, illustrated by the right dotted line in FIG. 1. In this embodiment, a wire (the right dotted line) connecting the target following assembly 300 and the second power module 230 is embedded in the housing 210; In other embodiments, the wire can be mounted on the surface of the housing 210 (in the accommodation space 211 or the external environment). The target following assembly 300 should be better mounted on the external surface of the housing 210 or be embedded into the housing 210 with a portion thereof exposed externally. On one hand, it saves the accommodation space 211 being occupies; on the other hand, the target following assembly 300 can be easily installed or removed to repair. The target following assembly 300 includes three sub-modules: a signal receiving RF module 310, at least 3 laser rangefinders 320 and the controller 330. Below is the description for the sub-modules.

Figure 3:
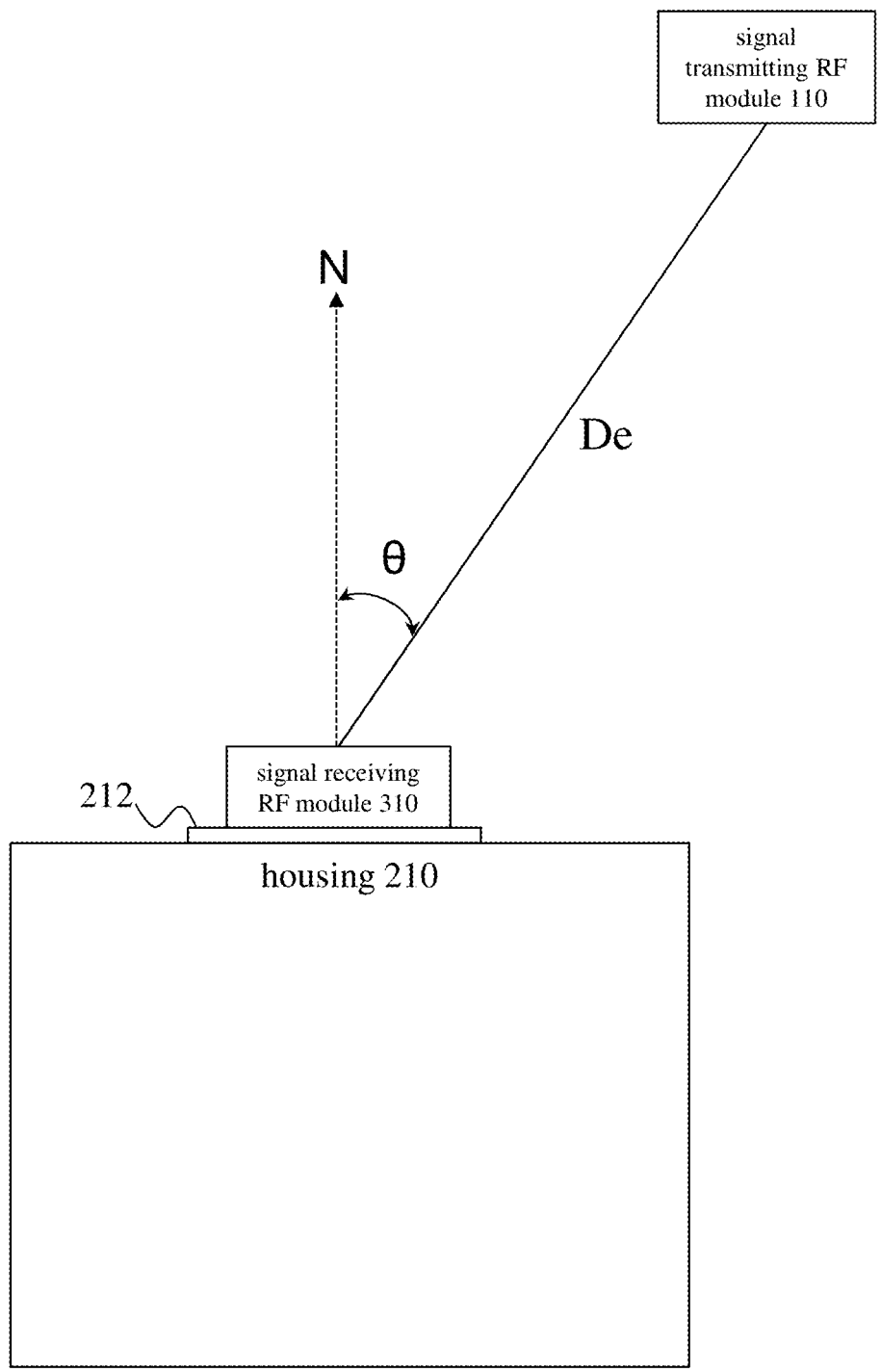
FIG. 3 shows definition of an estimated distance and a directional angle.

The signal receiving RF module 310 is selected according to the signal transmitting RF module 110 in the target-end device 100, so that it can pair with the signal transmitting RF module 110 and work to receive the RF signals sent from the signal transmitting RF module 110. Similarly, the signal receiving RF module 310 can also bi-directionally transmit and receive RF signals. Preferably, the signal receiving RF module 310 and the signal transmitting RF module 110 use the bandwidth of 5.8 G (802.11a/n/ac). The two RF modules work together to provide data to calculate an estimated distance and a directional angle. In order to have a better understanding, please see FIG. 3. It defines an estimated distance De and a directional angle $\theta$. The estimated distance De is defined by a distance between the signal transmitting RF module 110 and the signal receiving RF module 310 by RF signals sent from the signal transmitting RF module 110 and received by the signal receiving RF module 310. The estimated distance De is "estimated" since the RF signals may float when transmitting, causing mis-calculation of the real distance. The directional angle $\theta$ is defined by an angle between a direction from the signal transmitting RF module 110 to the signal receiving RF module 310 (a solid line) and a normal direction N to a front plane of the moving carrier 200 where the signal receiving RF module 310 is located. Here, a fixing plate 212 with a smooth plane for mounting the signal receiving RF module 310 is used to indicate the normal direction N. In another embodiment, the normal direction N can be defined by any plane of a device on the signal receiving RF module 310 as long as it won't be easily changed due to external forces or heat. In fact, there are already techniques to calculate the estimated distance De and the directional angle $\theta$ by using RF signals. Any techniques can be applied in the present invention. The key feature of the present invention is to control a distance between the target and the moving carrier 200 by the RF signals and results from couples of at least 3 laser rangefinders 320.

Figure 4:
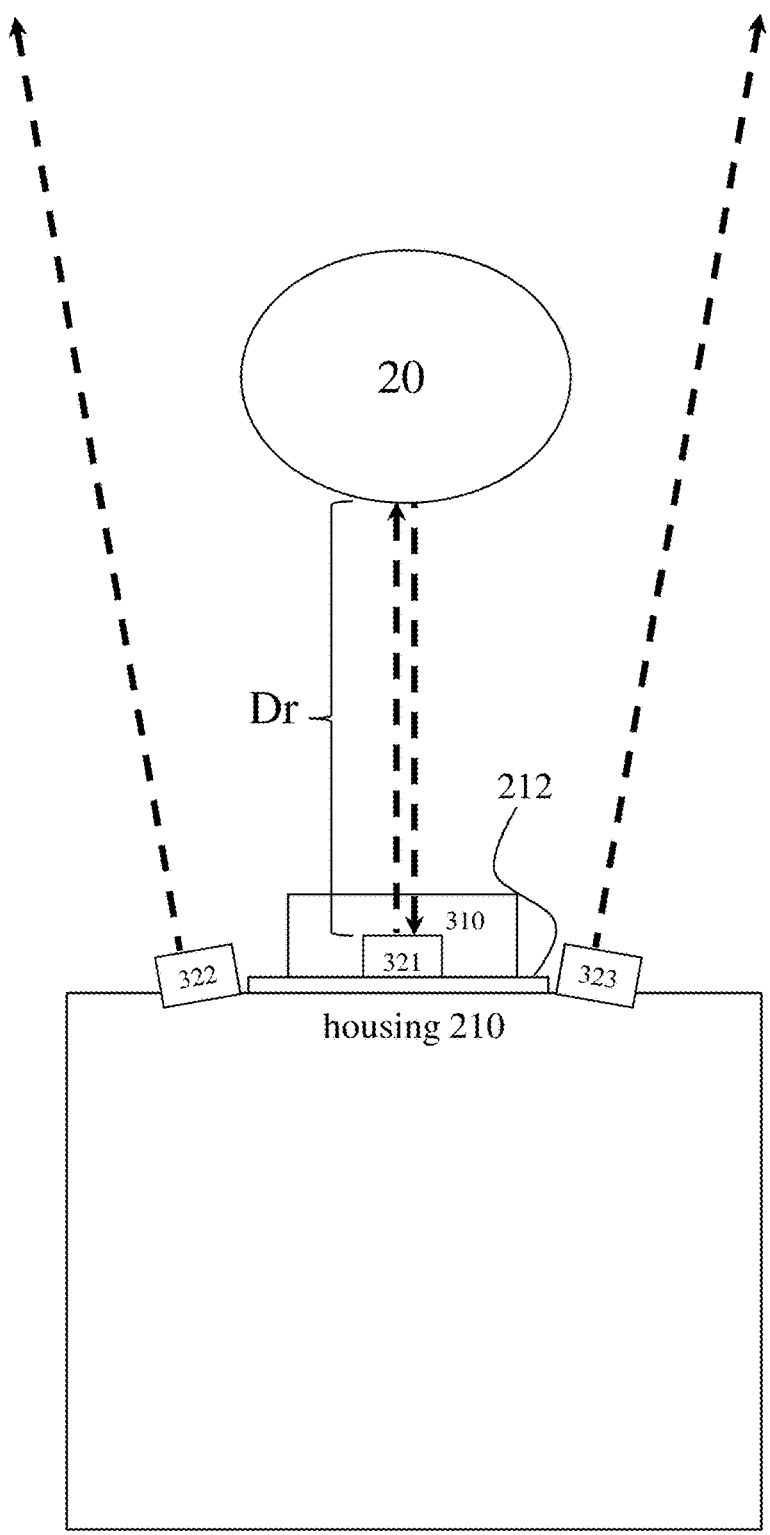
FIG. 4 shows an arrangement of laser rangefinders.

Please see FIG. 4. It shows an arrangement of laser rangefinders 310. Each laser rangefinder 320 is used to find (calculate) a precise relative distance Dr between a target 20 and itself by laser beams sent and reflected by the target 20. The number of the laser rangefinder 320 should be at least 3, e.g. 3, 4, 5 or more. Preferably, the number should be odd. It means there will be a central laser rangefinder 320. In this embodiment, in order to simply complexity of the target following assembly 300, three laser rangefinders 320 are applied. They are a first laser rangefinder 321, a second laser rangefinder 322 on the left of the first laser rangefinder 321, and a third laser rangefinder 323 on the right of the first laser rangefinder 321. One laser rangefinder 320 has a laser beam emitter (not show) and a laser beam receiver (not show). When the emitted laser beam reflected from the target 20 is received (the first laser rangefinder 321), the relative distance Dr will be available. However, when the emitted laser beam emitted without being reflected (also by the second laser rangefinder 322 and the third laser rangefinder 323), no distance data is available. It also means the associated laser rangefinder 320 cannot detect or trace the target 20. No matter how many laser rangefinders 320 are employed, they should be mounted aside the signal receiving RF module 310. This is because standards to calculate the estimated distance De and the relative distance Dr should be as close as possible.

Figure 5:
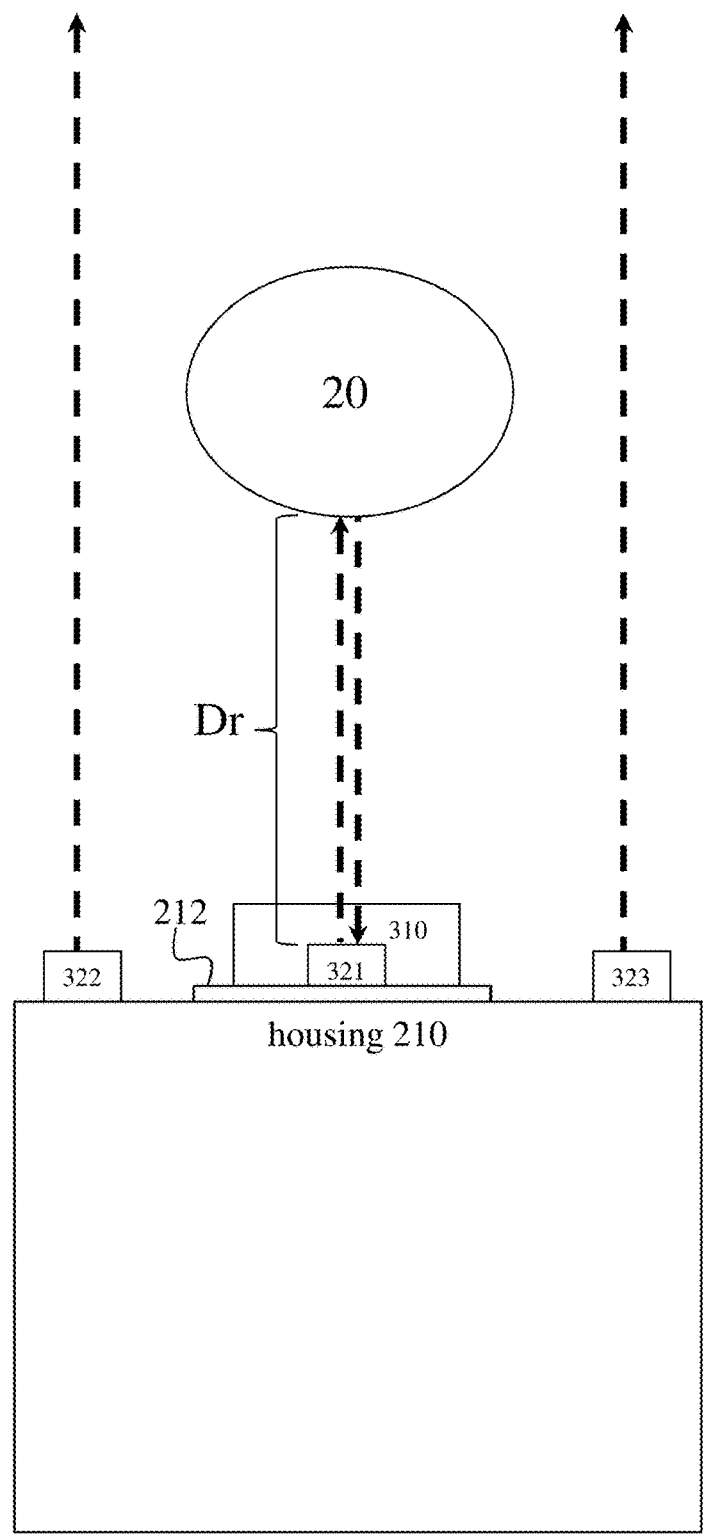
FIG. 5 shows another arrangement of laser rangefinders.

Each laser rangefinder 320 has a tracing direction which is where the laser beams are sent to. In this embodiment, the tracing directions of the three laser rangefinders 320 are different. The tracing direction of first laser rangefinder 321 is 0° and points up. In other word, the first laser rangefinder 321 has the tracing direction substantially along with the normal direction N to sends and receives laser beams. The tracing direction of second laser rangefinder 322 is 10° counterclockwise. The tracing direction of third laser rangefinder 323 is 10° clockwise. It means the tracing directions of the second laser rangefinder 322 and/or the third laser rangefinder 323 may deviate from that of the first laser rangefinder 321 to a predetermined angle. It is 10° in this example. Preferably, the predetermined angle can be larger but should not be larger than 45°. In another embodiment, as shown in FIG. 5, tracing directions of the three laser rangefinders 320 are the same. However, the second laser rangefinder 322 and the third laser rangefinder 323 are farther away from the first laser rangefinder 321. This arrangement of laser rangefinders 320 is also in the scope of the present invention. Difference between the arrangements in FIG. 4 and FIG. 5 is that the arrangement in FIG. 4 should be applied to one moving carrier 200 with a narrower front, e.g. a smart luggage, while the arrangement in FIG. 5 should be applied to one moving carrier 200 with a wider front, e.g. a golf cart.

The controller 330 is signally connected with the signal receiving RF module 310 and the at least 3 laser rangefinders 320. Meanwhile, in order to send commands to control the second control unit 223, a connecting wire (the left dotted line) is used as shown in FIG. 1. Similarly, the connecting wire can be embedded in the housing 210, it can also be arranged on the surface of the housing 210. The controller 330 operates to calculate the estimated distance De and the directional angle θ, send commands to the second control unit 223 to control moving of the moving carrier 200, and dynamically track the target 20 by one of the laser rangefinders 320, so that the relative distance Dr is able to be successively calculated.

Figure 6:
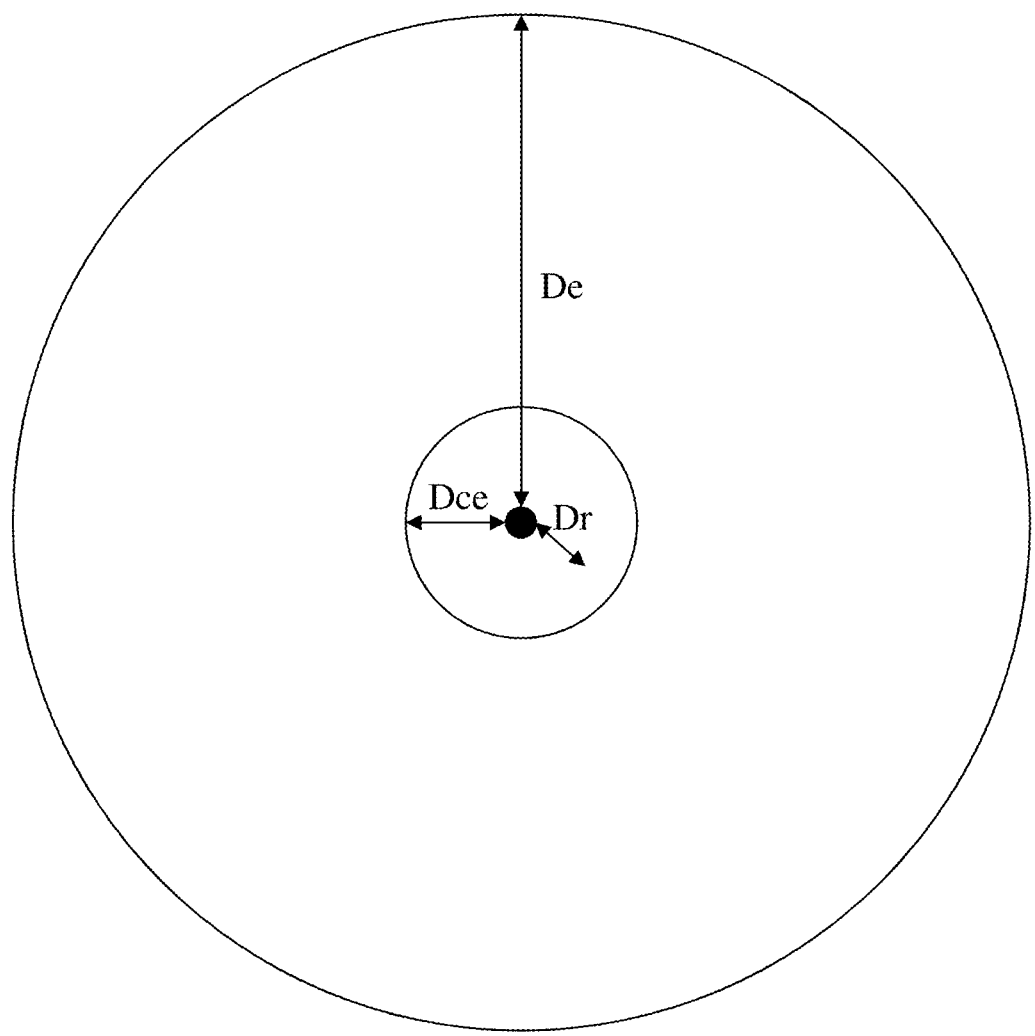
FIG. 6 shows a relationship between a control exchange distance, a relative distance and an estimated distance.

The present invention utilizes two techniques to obtain a distance between the target and the tracer (laser rangefinder 320 or signal receiving RF module 310) itself. The controller 330 uses feedback message from the signal receiving RF module 310 to calculate the estimated distance De and the directional angle θ so that absolute position recognition can be available. Meanwhile, the controller 330 also uses the results from the laser rangefinders 320 to obtain a relative position recognition. Accuracy of the latter in better than the former. Therefore, when the target is closer to the controller 330 (a common standard for the tracers), the relative distance Dr can be used to represent the "real distance". When the target is far from the controller 330, the estimated distance De is used since there might be many obstacles between the laser rangefinder 320 and the target, and the relative distance Dr may be incorrect. However, how far can the relative distance Dr and the estimated distance De be switched for use? Here, a control exchange distance Dce is defined to be the border of application of the relative distance Dr and the estimated distance De. In practice, the relative distance Dr better falls between 1.5 m to 2.5 m. Preferably, it is 2 m. Please see FIG. 6. It shows a relationship between the control exchange distance Dce, the relative distance Dr and the estimated distance De. Generally, the estimated distance De can be far, ranging from 2 m to more than 20 m. If the distance between the controller 330 and the target is shorter than the control exchange distance Dce (obtained from the signal receiving RF module 310), the relative distance Dr from the laser rangefinders 320 takes over as the real distance. Although the distance data from the laser rangefinders 320 are adopted, the controller 330 keeps calculating the estimated distance De and the directional angle θ for other unexpected situations.

The controller 330 drives the moving carrier 200 toward the target so that the distance therebetween reduces. Meanwhile, the controller 330 maintains the directional angle θ substantially 0 degree until the estimated distance is shorter than the control exchange distance Dce. As mentioned above, when the estimated distance De is shorter than the control exchange distance Dce, the controller 330 still calculates the estimated distance De and the directional angle θ while drives the moving carrier 200 to keep the relative distance Dr within a predetermined range, and to maintain the normal direction N substantially toward the target. The predetermined range, for example 0.5 m, is set to keep the moving carrier 200 away from the target in case of collision. The normal direction N substantially toward the target is maintained by below method. Please come back to FIG. 4. If the second laser rangefinder 322 on the left of the first laser rangefinder 321 traces the target 20, it means the normal direction N rotates a little bit clockwise. It is just to turn the moving carrier 200 left until the first laser rangefinder 321 traces the target 20. The normal direction N is substantially toward the target 20. On the contrary, if the third laser rangefinder 323 on the right of the first laser rangefinder 321 traces the target 20, it means the normal direction N rotates a little bit counterclockwise. It is just to turn the moving carrier 200 right until the first laser rangefinder 321 traces the target 20. The normal direction N is substantially toward the target 20 again.

The frame rate of the laser rangefinders 320 and the signal receiving RF module 310 (data fetching frequency) may be dozens of times per second, e.g. 10 times per second. Therefore, when something or someone quickly come between the target and the controller 330, it is hard to find the distance in between. So, there are some special designs to switch distance determining control to settle the above problem. When the estimated distance De is found to be shorter than the control exchange distance Dce, the controller 330 can further check whether the relative distance Dce is shorter than a predetermined percentage of the control exchange distance De or no laser rangefinder 320 traces the target. It is to check whether there is someone or something suddenly comes in, or the target is missed. If one of said conditions happens, the controller 330 utilizes the estimated distance De and the directional angle θ to drive the moving carrier 200, rather than the relative distance Dr determined by the laser rangefinders 320. Preferably, the predetermined percentage ranges from 50% to 90%. In other words, a sudden change of relative distance Dce is up to 1 m or 1.8 m. In another condition, when the controller 330 utilizes the relative distance Dr and a relative angle, which is between the normal direction N and a connecting line from the first laser rangefinder 321 to the target 20, to drive the moving carrier 200, the controller 330 also checks whether a difference between the directional angle θ and the relative angle falls within a predetermined range of degrees. If the difference falls within the predetermined range of degrees, keep driving the moving carrier 200 with the relative distance Dr and the relative angle. If the difference does not fall within the predetermined range of degrees, drive the moving carrier 200 with the estimated distance De and the directional angle θ. The predetermined range of degrees should not be set too large. A better example could be +3%~−3%.

Figure 7:
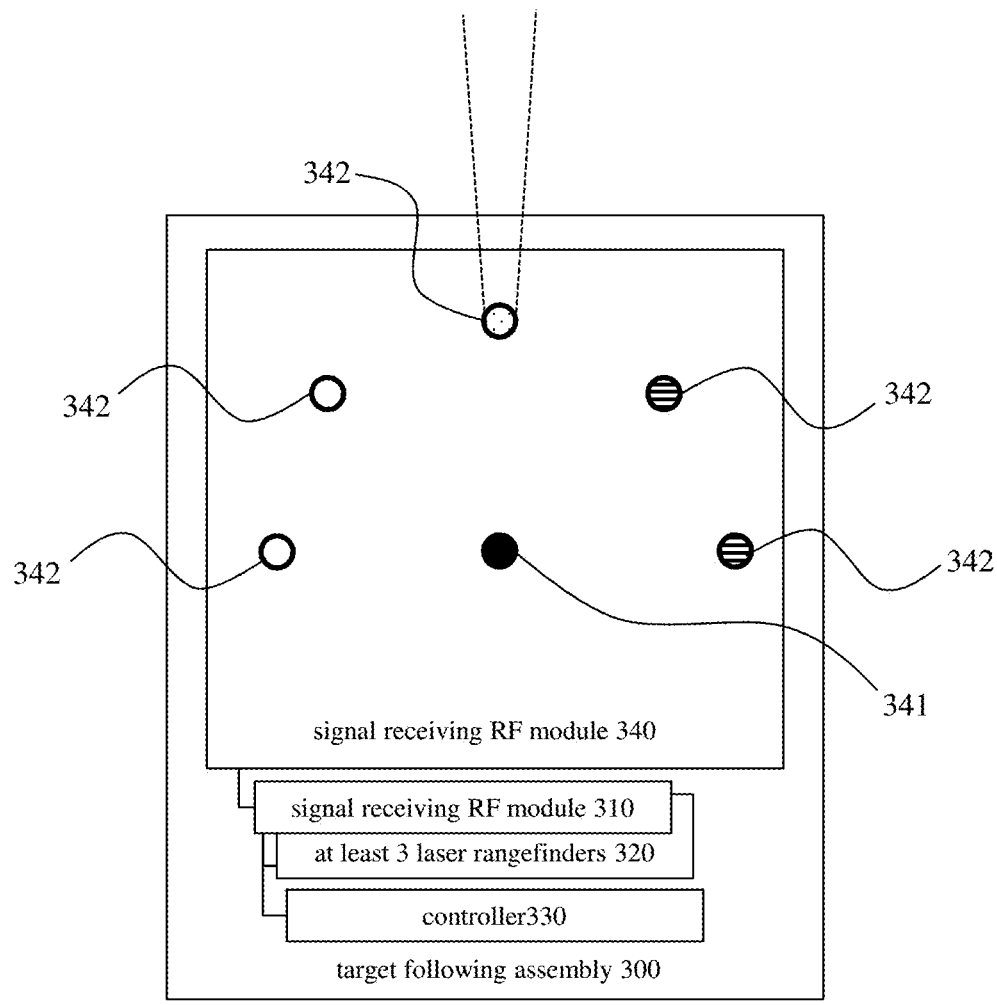
FIG. 7 shows the arrangement of the antenna.

According to the present invention, the target following assembly 300 may further comprise an antenna module 340. The target following assembly 300 is connected to the signal receiving RF module 310, for receiving the signals from the signal transmitting RF module 110. The antenna module may include an omnidirectional antenna 341 and at least 3 directional antennas 342. Arrangement of the antenna is shown in FIG. 7. The omnidirectional antenna 341 receives signals from the signal transmitting RF module 110 for pairing. It stops operating after pairing is finished. Namely, the omnidirectional antenna 341 is used to build connection between the signal transmitting RF module 110 and the signal receiving RF module 310. The number of the directional antennas 342 is better to be 3, 5, 7. Each directional antenna 342 can receive signals from a specific range of horizontal angles. For example, the directional antenna 342 marked by dots receives signals from the top side of FIG. 7 with a specific range of horizontal angles indicated by two dashed lines. A difference between central directional angles of the specific range of horizontal angles for any two directional antennas 342 is a multiple of a fixed angle. In FIG. 7, the central directional angle of the specific range of horizontal angles for any directional antenna 342 is along the connection between itself and the omnidirectional antenna 341 and faces outward. The directional angle θ can be determined by the directional antennas 342 receiving the signals. For example, the two directional antennas 342 marked with slashes receive the signals from the signal transmitting RF module 110. A more precise directional angle θ can be obtained by the signal strength found in the directional antennas 342. The directional angle θ falls within the central directional angles of the specific range of horizontal angles of two directional antennas 342 is closer to the one with stronger received signal strength.

Sometimes, if the target moves too fast to follow (causing the target away from the signal receiving RF module 310 more that the signals can reach) or there are noises in the environment, the connection between the signal transmitting RF module 110 and the signal receiving RF module 310 will be lost. Namely, the at least 3 directional antennas 342 receive no signals from the signal transmitting RF module 110. If it happens, the omnidirectional antenna 341 will initiate again for pairing. Thus, the connection can be rebuilt.

Figure 8:
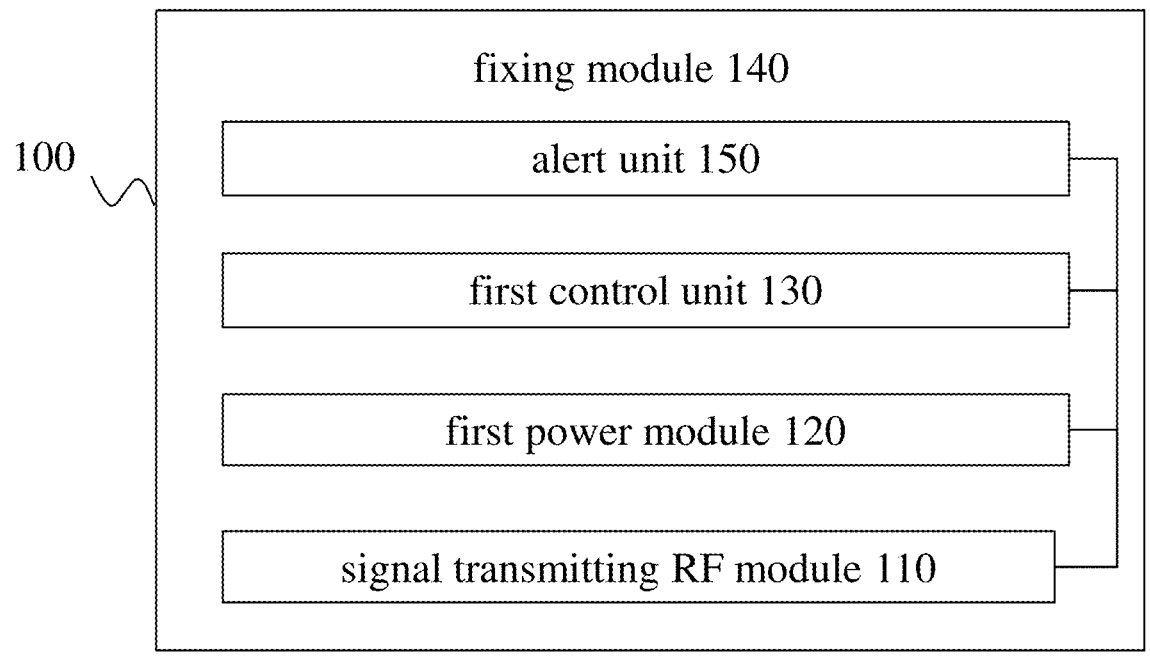
FIG. 8 shows a schematic diagram of a target-end device in an embodiment of the present invention.

In another embodiment, the target-end device 100 may further comprise an alert unit 150. Please refer to FIG. 8. The alert unit 150 is electrically connected to the first control unit 130 and the first power module 120. It can provide alert message. In practice, the alert unit 150 may be a buzzer, a LED, a micro speaker, or a micro-motor. Thus, the alert message may be in the form of beep, voice, music, light, or vibration. If the directional antennas 342 receive no signals from the signal transmitting RF module 110, the controller 330 will send an alert signal to the alert unit 150 via the signal receiving RF module 310 and the signal transmitting RF module 110 to release the alert message.

According to the present invention, a method for following a target is also provided. Please refer to FIG. 9. It is flow chart of the method. A first step of the method is providing a signal transmitting RF module mounted on a target, a signal receiving RF module on a moving carrier, and at least 3 laser rangefinders aside the signal receiving RF module (S01). Equipment mentioned functions the same as the one with corresponding name above. Then, a next step is calculating an estimated distance and a directional angle (S02). Definitions of the estimated distance and the directional angle are the same as that disclosed in the previous embodiments. It is not repeated again. It should be noticed that a first laser rangefinder in the laser rangefinders has a tracing direction substantially along with the normal direction disclosed in the previous embodiment to sends and receives laser beams.

A third step is driving the moving carrier toward the target while maintaining the directional angle substantially 0 degree (S03). This step lets the moving carrier moving toward the target controlled by the location data (the estimated distance and the directional angle). Then, it is a repeating loop from calculating the location data to lead the moving carrier: repeating step S02 and step S03 until the estimated distance is shorter than a control exchange distance (S04). The control exchange distance has the same definition in the previous embodiments. In practice, the control exchange distance should range from 1.5 m to 2.5 m.

As mentioned above, once the distance is shorter than the control exchange distance, the distance between the moving carrier and the target is determined by the laser rangefinder. So, a next step is dynamically tracking the target by one of the laser rangefinders so that a relative distance between said laser rangefinder and the target is able to be successively calculated while calculating the estimated distance and the directional angle (S05). "Dynamically tracking the target" means no one of the laser rangefinders is assigned to trace and find the distance between itself and the target. As long as one laser rangefinder find the target, its data can be used until the first laser rangefinder becomes in charge of this job. The last step of the method is driving the moving carrier to keep the relative distance within a predetermined range and maintain the normal direction substantially toward the target (S06). The target can be followed this way.

However, there are some unpredicted conditions to disturb distance measuring for RF modules and/or the laser rangefinder. Therefore, there must be some extra steps to deal with these problems. Before the data from the laser rangefinder can be steadily used, checking steps must be taken. For example. After step S05, there are two extra steps: checking whether the relative distance is shorter than a predetermined percentage of the control exchange distance or no laser rangefinder traces the target (S05-1) and if one of the condition in step S05-1 happens, repeating step S02 and step S03; otherwise, processing step S06 (S05-2). Step S05-1 determines whether the relative distance drops significantly, or the laser rangefinders lost to trace the target which was traced by the RF modules. In other word, it checks if someone or something suddenly come between the target and the laser rangefinder, or the laser rangefinders fail to catch the target. If step S05-1 happens, step S05-2 lets the data calculated from RF modules to be used to make sure where the target is now. After the location of the target is confirmed, the method will continue from step S04. Here, the predetermined percentage should range from 50% to 90%.

In another condition, there may be extra steps after step S06. A first one is checking whether a difference between the directional angle and a relative angle between the normal direction and a connecting line from the first laser rangefinder to the target falls within a predetermined range of degrees (S07). A second step is if a result of step S07 is yes, repeating step S06; if the result of step S07 is no, repeating step S02 and step S03. Steps S07 and S08 are used to deal with the situation that someone suddenly comes between the target and the laser rangefinders, causing different judgement of directions from the RF modules. Preferably, the predetermined range of degrees is better +3%~−3%.

As the target-following carrier does, the method also provides the same processes to maintain the normal direction substantially toward the target. It is achieved by turning the moving carrier left until the first laser rangefinder traces the target if a second laser rangefinder on the left of the first laser rangefinder traces the target, and turning the moving carrier right until the first laser rangefinder traces the target if a third laser rangefinder on the right of the first laser rangefinder traces the target. Preferably, tracing directions of the second laser rangefinder and/or the third laser rangefinder deviates from that of the first laser rangefinder to a predetermined angle. Similarly, the predetermined angle should not be larger than 45°.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for following a target, comprising the steps of:
    A. providing a signal transmitting radio frequency (RF) module mounted on a target, a signal receiving RF module on a moving carrier, and at least 3 laser rangefinders aside the signal receiving RF module;
    B. calculating an estimated distance between the signal transmitting RF module and the signal receiving RF module, and a directional angle between a direction from the signal transmitting RF module to the signal receiving RF module and a normal direction to a front plane of the moving carrier where the signal receiving RF module is located by RF signals sent from the signal transmitting RF module and received by the signal receiving RF module, wherein a first laser rangefinder has a tracing direction substantially along with the normal direction for sending and receiving laser beams;
    C. driving the moving carrier toward the target while maintaining the directional angle substantially 0 degree;
    D. repeating step B and step C until the estimated distance is shorter than a control exchange distance;
    E. dynamically tracking the target by one of the laser rangefinders so that a relative distance between said laser rangefinder and the target is able to be successively calculated while calculating the estimated distance and the directional angle; and
    F. driving the moving carrier to keep the relative distance within a predetermined range and maintain the normal direction substantially toward the target.

2. The method according to claim 1, further comprising steps after step E and step F:
    E1. checking whether the relative distance is shorter than a predetermined percentage of the control exchange distance or no laser rangefinder traces the target; and
    E2. if one of the condition in step E1 happens, repeating step B and step C; otherwise, processing step F.

3. The method according to claim 2, wherein the predetermined percentage ranges from 50% to 90%.

4. The method according to claim 1, further comprising steps after step F:
    G. checking whether a difference between the directional angle and a relative angle between the normal direction and a connecting line from the first laser rangefinder to the target falls within a predetermined range of degrees; and
    H. if a result of step G is yes, repeating step F; if the result of step G is no, repeating step B and step C.

5. The method according to claim 4, wherein the predetermined range of degrees is +3%~−3%.

6. The method according to claim 1, wherein the normal direction substantially toward the target is maintained by turning the moving carrier left until the first laser rangefinder traces the target if a second laser rangefinder on the left of the first laser rangefinder traces the target and turning the moving carrier right until the first laser rangefinder traces the target if a third laser rangefinder on the right of the first laser rangefinder traces the target.

7. The method according to claim 6, wherein tracing directions of the second laser rangefinder and/or the third laser rangefinder deviate from that of the first laser rangefinder to a predetermined angle.

8. The method according to claim 7, wherein the predetermined angle is not larger than 45°.

9. The method according to claim 1, wherein the control exchange distance ranges from 1.5 m to 2.5 m.

10. A system for following a target, comprising:
    a signal transmitting RF module, mounted on a target to be followed, working to send RF signals;
    a signal receiving RF module, mounted on a moving carrier, pairing with the signal transmitting RF module, working to receive the RF signals sent from the signal transmitting RF module;
    at least 3 laser rangefinders, mounted aside the signal receiving RF module, each calculating a relative distance between itself and the target; and
    a controller, signally connected with the signal receiving RF module and the at least 3 laser rangefinders, operating to calculate an estimated distance between the signal transmitting RF module and the signal receiving RF module, and a directional angle between a direction from the signal transmitting RF module to the signal receiving RF module and a normal direction to a front plane of the moving carrier where the signal receiving RF module is located by RF signals sent from the signal transmitting RF module and received by the signal receiving RF module, send commands to control moving of the moving carrier, and dynamically track the target by one of the laser rangefinders so that the relative distance is able to be successively calculated, wherein a first laser rangefinder has a tracing direction substantially along with the normal direction for sending and receiving laser beams; the controller keeps calculating the estimated distance and the directional angle and drives the moving carrier toward the target while maintains the directional angle substantially 0 degree until the estimated distance is shorter than a control exchange distance; when the estimated distance is shorter than the control exchange distance, the controller still calculates the estimated distance and the directional angle while drives the moving carrier to keep the relative distance within a predetermined range and maintain the normal direction substantially toward the target.

11. The system according to claim 10, wherein when the estimated distance is found to be shorter than the control exchange distance, the controller further checks whether the relative distance is shorter than a predetermined percentage of the control exchange distance or no laser rangefinder traces the target; if one of said conditions happens, the controller utilizes the estimated distance and the directional angle to drive the moving carrier.

12. The system according to claim 11, wherein the predetermined percentage ranges from 50% to 90%.

13. The system according to claim 10, wherein when the controller utilizes the relative distance and a relative angle, which is between the normal direction and a connecting line from the first laser rangefinder to the target, to drive the moving carrier, the controller also checks whether a difference between the directional angle and the relative angle falls within a predetermined range of degrees; if the difference falls within the predetermined range of degrees, keep driving the moving carrier with the relative distance and the relative angle; if the difference does not fall within the predetermined range of degrees, drive the moving carrier with the estimated distance and the directional angle.

14. The system according to claim 13, wherein the predetermined range of degrees is +3%~−3%.

15. The system according to claim 10, wherein the normal direction substantially toward the target is maintained by turning the moving carrier left until the first laser rangefinder traces the target if a second laser rangefinder on the left of the first laser rangefinder traces the target and turning the moving carrier right until the first laser rangefinder traces the target if a third laser rangefinder on the right of the first laser rangefinder traces the target.

16. The system according to claim 15, wherein tracing directions of the second laser rangefinder and/or the third laser rangefinder deviate from that of the first laser rangefinder to a predetermined angle.

17. The system according to claim 16, wherein the predetermined angle is not larger than 45°.

18. The system according to claim 10, wherein the control exchange distance ranges from 1.5 m to 2.5 m.

19. The system according to claim 10, further comprising an antenna module, connected to the signal receiving RF module, for receiving the signals from the signal transmitting RF module, wherein the antenna module comprises:

an omnidirectional antenna, receiving signals from the signal transmitting RF module for pairing and stopping operating after pairing is finished; and at least 3 directional antennas, each receiving signals from a specific range of horizontal angles, wherein a difference between central directional angles of the specific range of horizontal angles for any two directional antennas is a multiple of a fixed angle.

20. The system according to claim 19, wherein when the at least 3 directional antennas receive no signals from the signal transmitting RF module, the omnidirectional antenna initiates again for pairing.

* * * * *